US005433691A

United States Patent [19]

Hiraoka

[11] Patent Number: 5,433,691

[45] Date of Patent: Jul. 18, 1995

[54] ELASTIC ROLL MEMBERS

[75] Inventor: Iwao Hiraoka, Okegawa, Japan

[73] Assignee: Nihon F.T.B. Co., Ltd., Tokyo, Japan

[21] Appl. No.: 202,277

[22] Filed: Feb. 25, 1994

[51] Int. Cl.$^{6}$ .......... B23P 15/00

[52] U.S. Cl. .......... 492/45; 492/56; 492/49

[58] Field of Search .......... 492/49, 45, 56; 29/895.2, 895.3, 895.32

[56] References Cited

FOREIGN PATENT DOCUMENTS 5-92533 12/1993 Japan .

*Primary Examiner*—Irene Cuda

*Attorney, Agent, or Firm*—Frishauf, Holtz, Goodman & Woodward

[57] ABSTRACT

An elastic roll member that can be suitably used in OA printers, facsimile machines and in the developing unit and the paper feed unit of an electronic copying machine comprises a shaft member having a circular cross section and an elastic member concentrically attached to the outer periphery of the shaft member. The shaft member is provided with a connecting member which is different in cross section from and larger in diameter than the shaft member along its longitudinal direction, so that by forcing the connecting member into a through-hole provided in the elastic member, the shaft member and the elastic member can be integrally combined. The elastic roll member can be manufactured with ease and at low cost as it requires no complicated adhesion process.

20 Claims, 2 Drawing Sheets

ELASTIC ROLL MEMBERS

BACKGROUND OF THE INVENTION AND RELATED ART STATEMENT

The present invention relates to elastic roll members, and more particularly to elastic roll members used suitably in OA printers, facsimile machines as well as in the development unit and the paper feed unit of an electronic copying machine for measuring and supplying the toner.

In the prior art, so-called sponge rollers are widely used as an elastic roll member for supplying or measuring the toner in an electronic copying machine, the roll member comprising a metal shaft member which is circular in cross section and a sponge member which is concentrically attached to the metal shaft on its outer periphery.

In the manufacture of such sponge rolls, a hot melt film adhesive is wound about a heated metal shaft and cooled to harden. The shaft member is then inserted and positioned in a through-hole of a sponge member having a rectangular cross section, and then heated to melt the once hardened adhesive to cause the sponge member and the shaft member to become integrally bonded. The sponge member is subsequently shaped into a cylinder of a desired diameter.

It has been pointed out, however, that despite substantial absence of load (torque) during their use for supplying toner, etc., manufacture of the sponge rolls involves excessively complicated and costly steps of bonding the members.

SUMMARY OF THE INVENTION

According to the present invention, a connecting member having a diameter larger than and a cross section different from those of the shaft member is provided along the longitudinal direction of the shaft member, and the connecting member is forced into the through-hole of an elastic member such as a sponge to integrally combine the shaft member and the elastic member. This eliminates the troublesome step of bonding the members and greatly reduces the production cost.

Instead of conventional aluminum alloys and other metals, plastics may be suitably used as the shaft material to reduce the weight as well as to further facilitate the processing. As the material for the elastic member, synthetic rubber may be used instead of synthetic resin with continuous foams such as sponge depending on the use.

The connecting member to be provided along the longitudinal direction of the shaft member may have a plurality of spiral ridges. This facilitates insertion of the shaft in the through-hole of a sponge member by simply rotating the same in the direction of the spiral.

A plurality of catches may be projected from the connecting member in the radial direction at a given angle to cause the catches to resist against the rotation of the shaft member. Alternatively, a plurality of catches may be arranged along the longitudinal direction of and project in the radial direction from the connecting member. In either case, the shaft member and the elastic member that rotate in the respective given directions or in both directions can be adequately integrated.

The connecting member may be provided with a longitudinal groove along its outer periphery at a given position to thereby integrate the shaft and the elastic members into one in the rotational direction and to prevent displacement or disengagement in the axial direction. This greatly improves the durability of the roll member. It is also possible to form an engagement groove on either side of the shaft member, to which a spacer may be attached to prevent the axial movement.

Figure 1:
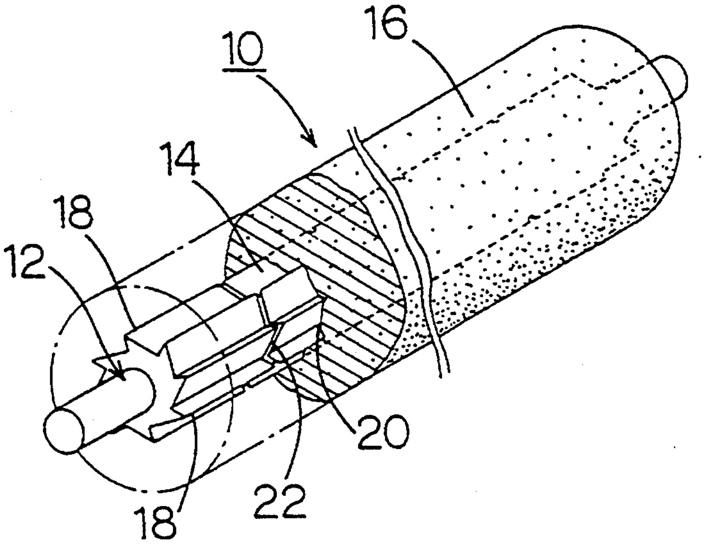
FIG. 1 shows a partially exploded perspective view of a preferred embodiment of the elastic roll member according to the present invention.
Figure 2A:
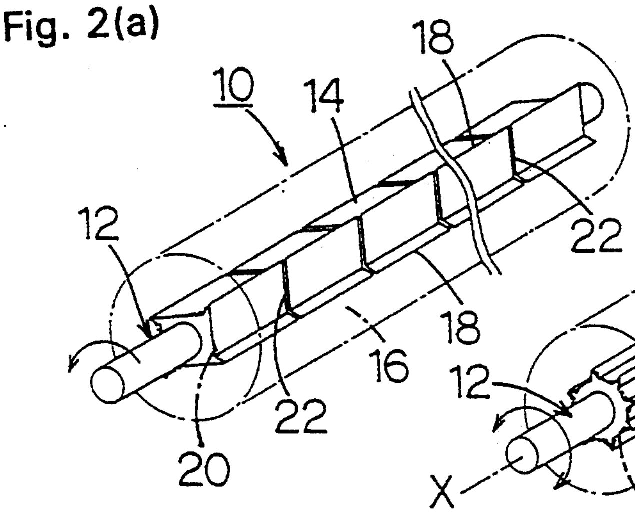
Figure 2C:
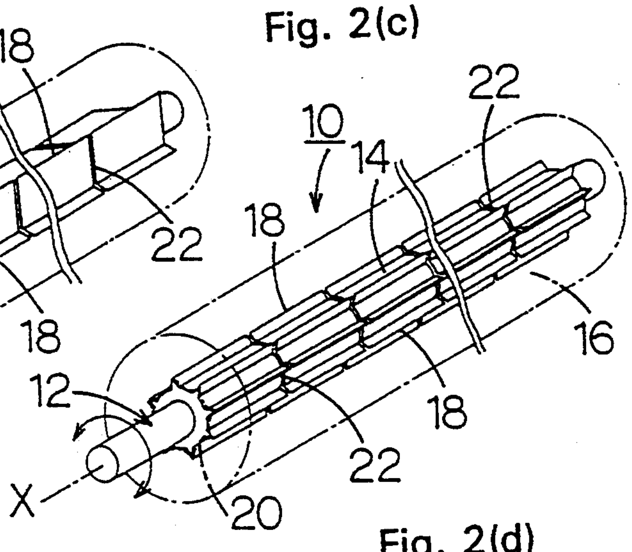
Figure 2B:
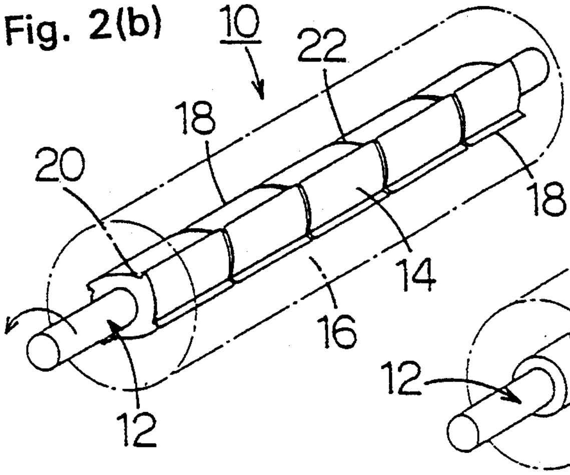
Figure 2D:
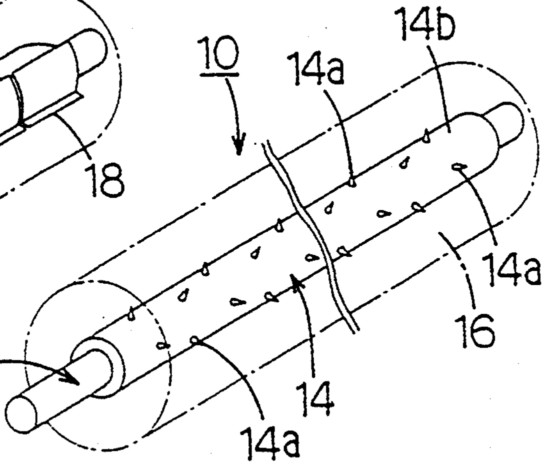

FIGS. *2a* through *2d* are perspective views to show variations of the connecting member in the elastic roll member shown in FIG. 1.

Figure 3:
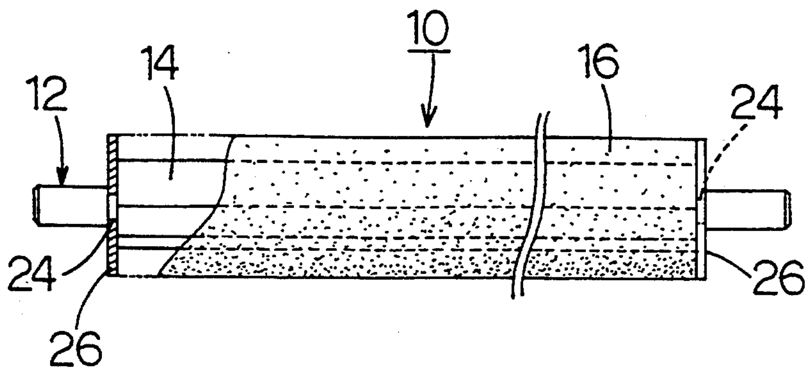

FIG. 3 is a partial sectional side view to show another embodiment of the elastic roll member according to the present invention.

Figure 4:
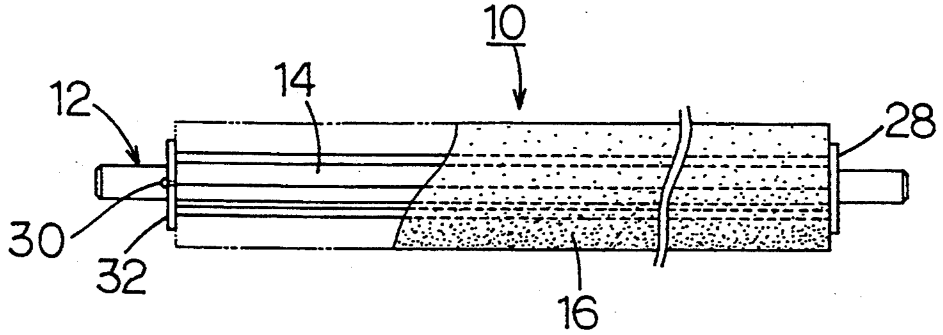

FIG. 4 is a side view to show still another embodiment of the elastic roll member according to the present invention.

Figure 5:
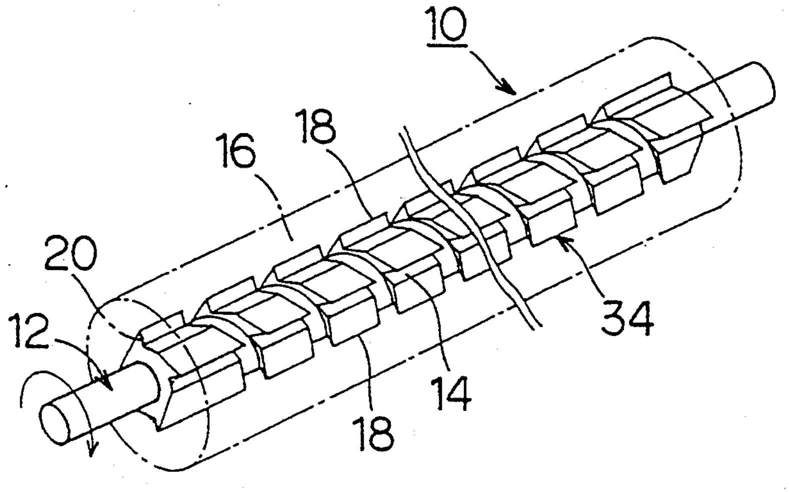

FIG. 5 is a perspective view to show still another embodiment of the elastic roll member according to the present invention, the connecting member being shown in solid lines and the elastic member being shown in dotted lines.

PREFERRED EMBODIMENTS OF THE INVENTION

In FIG. 1, the elastic roll member 10 of the present invention comprises a shaft member 12, a connecting member 14 which is formed along the longitudinal direction of the shaft member and which has a cross section different from that of said shaft member, and an elastic member 16 such as a sponge member which has a predetermined density and elasticity and which is concentrically attached to the outer periphery of the connecting member 14.

The shaft member 12 may be made of metal such as aluminum alloy, but is more preferably made of synthetic resin such as a polycarbonate base resin to facilitate processing of the connecting member 14 and machining of the end portions of the shaft. The weight of the elastic roll member 10 as a whole can also be decreased.

A plurality of catches 18 are formed in the radial direction of the connecting member 14. The connecting member 14 including the catches 18 is forced into a through-hole 20 formed in advance in the sponge member 16, the diameter of the through-hole 20 being, for example, 50 to 70% of the diameter of the shaft member 12. The elastic resilience of the sponge member 16 enables the inner face of the through-hole 20 to bite into the connecting member 14, enabling the shaft member 12 and the sponge member 16 to be firmly integrated.

By bending the catches 18 formed in the radial direction of the connecting member 14 at a given angle that opposes to the rotational direction (shown by an arrow in FIGS. 2(*a*)–2(*c*)) of the shaft member 12, the shaft member 12 and the sponge member 16 may be securely integrated with respect to their respective rotational directions.

As shown in FIG. *2c*, the catches 18 may be radially projected with respect to the axial line X in order to securely integrate the shaft member 12 and the sponge member 16 in any rotational direction.

As shown in FIG. 2(*d*), the connecting member 14 may comprise a plurality of needle-like projections 14*a* and a larger diameter portion 14*b*.

In the drawings, the reference number 22 denotes elongated grooves provided on the outer periphery of the connecting member 14 at a given interval. By causing the inner face of the through-hole 20 of the sponge member 16 to further bite into the grooves 22, the sponge member 16 can be prevented from moving in the radial direction of the shaft member 12. With such a construction, durability of the elastic roll member 10 can be improved.

Referring now to FIG. 3, the elongated grooves 22 are omitted, and engagement grooves 24 are provided instead on both ends of the connecting member 14, to which a thin plate spacer 26 may be attached to position the sponge member 16 and to prevent its movement in the axial direction. This construction is preferable when dimensional precision is required of the elastic roll member 10.

The embodiment shown in FIG. 4 is characterized in that a collar 28 is formed at one end of the connecting member 14, and a projection 30 projects from the other end in the axial direction so that the sponge member 16 attached to the connecting member 14 of the shaft member 12 can be held in place by said collar 28 and another collar member 32 fixed to the projection 30 by spot welding, etc. This enables the sponge member 16 to be positioned and prevented from moving.

The embodiment shown in FIG. 5 includes spiral ridges 34 extending along the longitudinal direction of the shaft member 12 that act as the connecting member 14. A plurality of catches 18 are provided in the radial direction of the spiral ridges 34, so that the shaft member 12 can be inserted into the through-hole 20 of the sponge member 16 by rotating the shaft member 12 in the direction of the spiral. In this case, the shaft member 12 can be inserted into the sponge member 16 smoothly with ease.

Because the shaft member 12 and the sponge member 16 can be interconnected without using adhesive, the production cost can be reduced.

As has been described in the foregoing, the elastic roll member according to the present invention is characterized in that as the connecting member, which is mounted on the shaft member is forced into the through-hole of the sponge member, the elastic resilience of the sponge member enables the sponge to bite into the connecting member, allowing the shaft member and the sponge member to be securely integrated with ease without requiring a complicated adhesion process. The elastic roll member can therefore be produced with high efficiency at a very low cost.

Use of synthetic resin as the material for the shaft member facilitates the machining process and reduces the weight of the roll member as a whole.

Although preferred embodiments of an elastic roll member according to the present invention have been described, the present invention is in no way limited by them, and it is obvious for those skilled in the art that various modifications and variations are possible without departing from the spirit or scope of the present invention, such as using foaming synthetic resin as the elastic member. Synthetic rubber with a higher density may be used as the material. The shape and the depth of the grooves of the connecting member can also be arbitrarily selected.

What is claimed is:

1. An elastic roll member comprising:

a rotatable shaft member having a circular cross section and an outer periphery;

a connecting member which has a different cross section from that of said shaft member and which is larger in diameter than said shaft member, said connecting member extending along a longitudinal direction of said shaft member and being fixedly connected to said shaft member; and an elastic member concentrically attached to the outer periphery of said shaft member with said connecting member interposed between said shaft member and said elastic member, said elastic member having a through-hole provided therein and said through-hole extending in a longitudinal direction of said elastic member;

and wherein said connecting member is forcibly inserted in said through-hole of said elastic member to thereby integrally combine said shaft member and said elastic member via said connecting member.

2. The elastic roll member of claim 1, wherein said connecting member comprises longitudinal spiral ridges formed along the longitudinal direction of said shaft member.

3. The elastic roll member of claim 2, wherein said connecting member comprises a plurality of radially extending catches provided thereon, said catches being arranged to extend at a given angle so that said catches oppose a rotational direction of said shaft member.

4. The elastic roll member of claim 1, wherein said connecting member comprises a plurality of radially extending catches provided thereon, said catches being arranged to extend at a given angle so that said catches oppose a rotational direction of said shaft member.

5. The elastic roll member of claim 2, wherein said connecting member comprises a plurality of catches provided thereon so as to project in a radial direction of said connecting member, said catches extending along a longitudinal direction of said connecting member.

6. The elastic roll member of claim 1, wherein said connecting member comprises a plurality of catches provided thereon so as to project in a radial direction of said connecting member, said catches extending along a longitudinal direction of said connecting member.

7. The elastic roll member of claim 1, wherein said connecting member comprises:

a plurality of needle-like members projecting in the radial direction of said shaft member; and a portion having a diameter larger than said shaft member.

8. The elastic roll member of claim 1, further comprising longitudinal grooves provided on an outer periphery of said connecting member at given positions spaced around said outer periphery of said connecting member.

9. The elastic roll member of claim 2, further comprising longitudinal grooves provided on an outer periphery of said connecting member at given positions spaced around said outer periphery of said connecting member.

10. The elastic roll member of claim 3, further comprising longitudinal grooves provided on an outer periphery of said connecting member at given positions spaced around said outer periphery of said connecting member.

11. The elastic roll member of claim 4, further comprising longitudinal grooves provided on an outer periphery of said connecting member at given positions spaced around said outer periphery of said connecting member.

12. The elastic roll member of claim 5, further comprising longitudinal grooves provided on an outer periphery of said connecting member at given positions spaced around said outer periphery of said connecting member.

13. The elastic roll member of claim 6, further comprising longitudinal grooves provided on an outer periphery of said connecting member at given positions spaced around said outer periphery of said connecting member.

14. The elastic roll member of claim 1, further comprising:

an engagement groove provided near respective opposite ends of said shaft member; and a spacer attached to each respective engagement groove to retain said elastic member on said shaft member.

15. The elastic roll member of claim 2, further comprising:

an engagement groove provided near respective opposite ends of said shaft member; and a spacer attached to each respective engagement groove to retain said elastic member on said shaft member.

16. The elastic roll member of claim 3, further comprising:

an engagement groove provided near respective opposite ends of said shaft member; and a spacer attached to each respective engagement groove to retain said elastic member on said shaft member.

17. The elastic roll member of claim 4, further comprising:

an engagement groove provided near respective opposite ends of said shaft member; and a spacer attached to each respective engagement groove to retain said elastic member on said shaft member.

18. The elastic roll member of claim 5, further comprising:

an engagement groove provided near respective opposite ends of said shaft member; and a spacer attached to each respective engagement groove to retain said elastic member on said shaft member.

19. The elastic roll member of claim 6, further comprising:

an engagement groove provided near respective opposite ends of said shaft member; and a spacer attached to each respective engagement groove to retain said elastic member on said shaft member.

20. The elastic roll member of claim 7, further comprising:

an engagement groove provided near respective opposite ends of said shaft member; and a spacer attached to each respective engagement groove to retain said elastic member on said shaft member.

* * * * *